(No Model.)
G. W. PRESCOTT.
SAW.
No. 408,669. Patented Aug. 6, 1889.
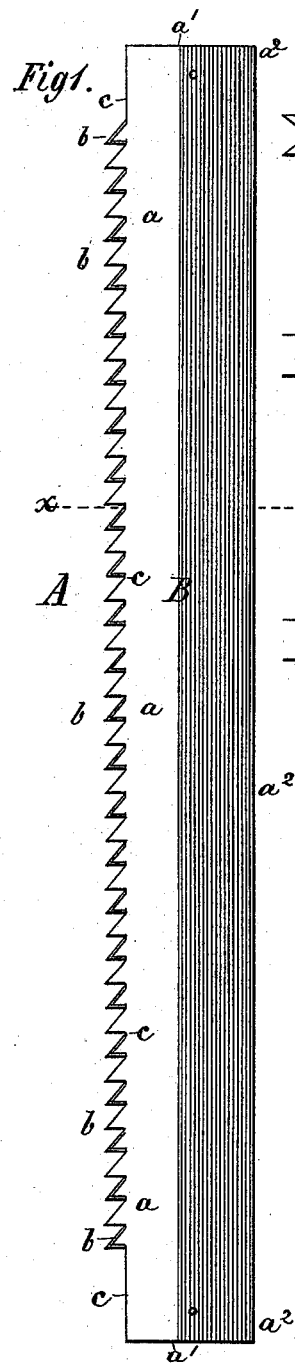
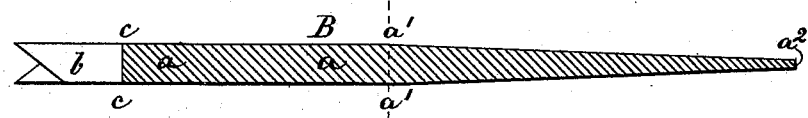
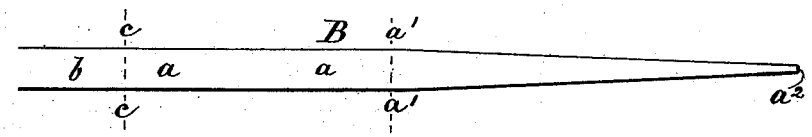
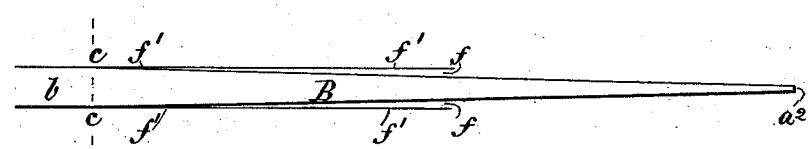
Witnesses:
J. P. Theo. Lang
E. J. Fenwick
Inventor:
George W. Prescott
by his attys
Marvin, Flemich & Lawrence

UNITED STATES PATENT OFFICE.

GEORGE W. PRESCOTT, OF EAU CLAIRE, WISCONSIN.

SAW.

SPECIFICATION forming part of Letters Patent No. 408,669, dated August 6, 1889.

Application filed December 13, 1888. Serial No. 293,498. (No model.)

*To all whom it may concern:*

Be it known that I, GEORGE W. PRESCOTT, a citizen of the United States, residing at Eau Claire, in the county of Eau Claire and State of Wisconsin, have invented certain new and useful Improvements in Gang-Saws; and I do hereby declare the following to be a full, clear, and exact description of the invention, such as will enable others skilled in the art to which it appertains to make and use the same.

My invention consists in a new article of manufacture—viz., the straight-cut or up-and-down reciprocating saw-blade—as hereinafter described and claimed.

The object of my invention is the production of a straight-cut or up-and-down reciprocating gang-saw for manufacturing lumber from the log, which shall take the place of or be an improvement on the straight-cut or up-and-down reciprocating gang-saw of the ordinary gage, which throughout the width of the saw blank or blade is of equal thickness, and for this reason liable to heat in the act of use, and which shall take the place of or be an improvement on what is known as the "thin" straight-cut or up-and-down reciprocating gang-saws which have their teeth very fine—only about five-eighths of an inch from point to point—and very short, in order to hold the "set" of the teeth, one grave objection to these being that it requires so much time and labor to sharpen the teeth, while at the same time the blade, being the same thickness throughout, is liable to heat, as well as run out of the direct line of the cut, and thus make crooked lumber. By my invention I produce a straight-cut or up-and-down reciprocating gang-saw, which is made in the usual manner, except that a proper proportion of a given width of toothed blade (say about two inches if the blade is four inches wide, or about four inches if the blade is eight inches wide) from the base of the teeth rearwardly shall be of one gage or thickness, or with parallel sides, and then taper to the back.

In the drawings, Figure 1 indicates my improved straight-cut or up-and-down reciprocating gang-saw. Fig. 2 is a transverse section in the line $x\ x$ of Fig. 1. Fig. 3 is a diagram of Fig. 1 in plan view; and Fig. 4 is a diagram showing a gang-saw in plan view, which tapers the entire width of the blade from the base of its teeth to its back edge.

In Figs. 1, 2, and 3 my improved straight-cut or up-and-down reciprocating gang-saw A is provided with teeth $b$, extending forward from the front edge or base-line $c$ of the blade or blank B, as shown.

Rearwardly from the edge $c$ (which is the base of the teeth) to the line $a'\ a'$ the blank B is made with parallel sides, or of one gage or thickness at $a$, for, say, about two inches in width when the saw-blades are four inches wide, or about four inches in width when the saw-blades are eight inches wide, and back from the line or point $a'\ a'$ to $a^2$ of the saw the blank B is made tapering, as shown. By thus constructing my straight-cut or up-and-down reciprocating gang-saw of the same or even thickness throughout its length for, say, about two inches of its width if the blade is about four inches wide, or about four inches thereof if the blade is about eight inches wide in rear of and from the base-line of the teeth, and then tapering the same to its back, the even thickness of the blade at $a$ affords all the requisite bearing on either side against the log being sawed to give the saw a steady up-and-down stroke. The teeth $b$ can be made far apart and do their work with very little set. The saw practically will not heat, and in the event the saw should diverge from a straight line in its cut through the log—it being thinner at its rear edge—it will easier and sooner in or in less distance get back to its true line than saws having equal thickness throughout. Thus by my construction I economize lumber by reason of the less width of kerf-cut as compared with that of other straight-cut up-and-down reciprocating gang-saws having the ordinary even thickness throughout, and as compared with a very thin saw-blade of even thickness throughout, which requires short teeth to hold its comparatively heavy set, to say nothing of the difference in time and labor required to sharpen the teeth.

The disadvantage of having the saw-blade taper from the immediate base $c\ c$ of the teeth $b$ to its back edge $a^2$, I will now demonstrate from the illustration shown in Fig. 4. Such a straight or up-and-down reciprocating gang-saw not only lacks the proper bearing against the walls of the kerf immediately in rear of the point of the cut to give steadiness or reciprocation to the blade, but such saws are continually wearing thinner at their front or tooth edge by reason of the sawdust working its way at such point into the kerf $f$ between the walls $f'$ $f'$ of the kerf and the blade B, the friction of the sawdust being such in many cases as to reduce the saws two gages in thickness in front. With my improved straight-cut up-and-down reciprocating gang-saw no such detrimental action can take place.

Finally, by making my improved saw in the form shown the same will possess all the relative advantages I have set forth, while at the same time it will possess this further resulting advantage that the metal composing it can, in the process of manufacturing the saw, be rolled down into the form specified with the same facility as would be the case if the blade were manufactured of the same thickness throughout or with no sudden depression in the line of roll shown in some of the patented saws of this class.

I make no claim to a circular saw having an annular depression in each of its faces between its periphery and eye, nor such saws with radial channels between such depressions and the eye, as in Letters Patent Nos. 214,389 and 211,259.

What I claim, and desire to secure by Letters Patent of the United States, is—

The within-described new article of manufacture, consisting of a straight-cut saw-blade adapted to saw lumber with a reciprocating up-and-down movement, said blade being formed with its sides, back, and teeth in one piece, and having an even thickness of metal from the base-line of the teeth rearwardly for a proper distance—say about two or four inches—according to the width of the blade, and tapered from the rearward termination of said portion of even thickness to its back edge, substantially as described.

In testimony whereof I hereunto affix my signature in presence of two witnesses.

GEORGE W. PRESCOTT.

Witnesses:
IRVING D. HULL,
OLE O. AUNSTAD.